(12) United States Patent
Aggarwal et al.

(10) Patent No.: US 7,990,965 B1
(45) Date of Patent: Aug. 2, 2011

(54) TRANSMISSION OF LAYER TWO (L2) MULTICAST TRAFFIC OVER MULTI-PROTOCOL LABEL SWITCHING NETWORKS

(75) Inventors: Rahul Aggarwal, San Francisco, CA (US); Sheth Nischal, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 864 days.

(21) Appl. No.: 11/192,432

(22) Filed: Jul. 28, 2005

(51) Int. Cl.
 *H04L 12/56* (2006.01)
(52) U.S. Cl. .................................................. 370/392
(58) Field of Classification Search .................. 370/217, 370/221, 312, 432, 392, 400, 401
See application file for complete search history.

(56) References Cited

U.S. PATENT DOCUMENTS

| | | | |
|---|---|---|---|
| 5,600,642 A | 2/1997 | Pauwels et al. | |
| 6,374,303 B1 | 4/2002 | Armitage et al. | |
| 6,477,166 B1 * | 11/2002 | Sanzi et al. | 370/395.1 |
| 6,493,349 B1 | 12/2002 | Casey | |
| 6,501,754 B1 | 12/2002 | Ohba et al. | |
| 6,553,028 B1 | 4/2003 | Tang et al. | |
| 6,597,703 B1 | 7/2003 | Li et al. | |
| 6,611,528 B1 | 8/2003 | Farinacci et al. | |
| 6,625,773 B1 | 9/2003 | Boivie et al. | |
| 6,731,652 B2 | 5/2004 | Ramfelt et al. | |
| 6,751,218 B1 | 6/2004 | Hagirahim et al. | |
| 6,778,531 B1 | 8/2004 | Kodialam et al. | |
| 6,807,182 B1 | 10/2004 | Dolphin et al. | |
| 6,879,594 B1 | 4/2005 | Lee et al. | |
| 6,920,503 B1 | 7/2005 | Nanji et al. | |
| 6,968,389 B1 | 11/2005 | Menditto et al. | |
| 7,035,226 B2 | 4/2006 | Enoki et al. | |
| 7,039,687 B1 * | 5/2006 | Jamieson et al. | 709/220 |
| 7,082,102 B1 | 7/2006 | Wright | |
| 7,133,928 B2 | 11/2006 | McCanne | |
| 7,251,218 B2 | 7/2007 | Jorgensen | |

(Continued)

FOREIGN PATENT DOCUMENTS

JP 2005-086222 3/2005
(Continued)

OTHER PUBLICATIONS

Aggarwal et al., "Establishing Point to Multipoint MPLS TE LSPs," IETF, submitted to Internet Engineering Task Force (IETF) Feb. 11, 2007, pp. 1-15.

(Continued)

*Primary Examiner* — Man Phan
*Assistant Examiner* — Nourali Mansoury
(74) *Attorney, Agent, or Firm* — Shumaker & Sieffert, P.A.

(57) ABSTRACT

Principles of the invention relate to techniques for transmission of Layer 2 (L2) multicast traffic over a point to multipoint (P2MP) label switched path (LSP) within a multi-protocol Label Switching (MPLS) network. The principles of the invention include configuring circuit cross-connect (CCC) switches that transparently cross-connect L2 interfaces to a P2MP LSP within an MPLS network. The transparent cross-connections allow L2 multicast traffic to be encapsulated as MPLS packets regardless of the type of payload the L2 multicast traffic is carrying. A CCC switch may be configured within an ingress router of a P2MP LSP to cross connect an L2 interface to the P2MP LSP. CCC switches may also be configured within each egress router of the P2MP LSP to cross-connect each leaf of the P2MP LSP to one or more L2 interfaces.

36 Claims, 4 Drawing Sheets

U.S. PATENT DOCUMENTS

| | | | |
|---|---|---|---|
| 7,269,135 | B2 | 9/2007 | Frick et al. |
| 7,281,058 | B1 | 10/2007 | Shepherd et al. |
| 7,330,468 | B1 | 2/2008 | Tse-Au |
| 7,333,491 | B2 | 2/2008 | Chen et al. |
| 7,359,328 | B1 | 4/2008 | Allan |
| 7,360,084 | B1 | 4/2008 | Hardjono |
| 7,366,894 | B1 | 4/2008 | Kalimuthu et al. |
| 7,418,003 | B1 | 8/2008 | Alvarez et al. |
| 7,463,591 | B1 | 12/2008 | Kompella et al. |
| 7,477,642 | B2 | 1/2009 | Aggarwal et al. |
| 7,483,439 | B2 | 1/2009 | Shepherd et al. |
| 7,519,010 | B1 | 4/2009 | Aggarwal et al. |
| 7,522,599 | B1 | 4/2009 | Aggarwal et al. |
| 7,522,600 | B1 | 4/2009 | Aggarwal et al. |
| 7,545,735 | B1 | 6/2009 | Shabtay et al. |
| 7,558,219 | B1 | 7/2009 | Aggarwal et al. |
| 7,558,263 | B1 | 7/2009 | Aggarwal et al. |
| 7,564,803 | B1 | 7/2009 | Minei et al. |
| 7,564,806 | B1 | 7/2009 | Aggarwal et al. |
| 7,570,604 | B1 | 8/2009 | Aggarwal et al. |
| 7,570,605 | B1 | 8/2009 | Aggarwal et al. |
| 7,830,787 | B1 | 11/2010 | Wijnands et al. |
| 2002/0071390 | A1 | 6/2002 | Reeves et al. |
| 2002/0109879 | A1* | 8/2002 | Wing So .................. 359/118 |
| 2002/0118644 | A1 | 8/2002 | Moir |
| 2002/0181477 | A1 | 12/2002 | Mo et al. |
| 2002/0186664 | A1 | 12/2002 | Gibson et al. |
| 2002/0191584 | A1 | 12/2002 | Korus et al. |
| 2003/0012215 | A1 | 1/2003 | Novaes |
| 2003/0021282 | A1* | 1/2003 | Hospodor .................. 370/401 |
| 2003/0031175 | A1 | 2/2003 | Hayashi et al. |
| 2003/0043772 | A1 | 3/2003 | Mathis et al. |
| 2003/0056007 | A1* | 3/2003 | Katsube et al. .......... 709/238 |
| 2003/0063591 | A1 | 4/2003 | Leung et al. |
| 2003/0087653 | A1 | 5/2003 | Leung et al. |
| 2003/0088696 | A1 | 5/2003 | McCanne |
| 2003/0099235 | A1 | 5/2003 | Shin et al. |
| 2003/0108047 | A1 | 6/2003 | Mackiewich et al. |
| 2003/0112748 | A1 | 6/2003 | Puppa et al. |
| 2003/0123446 | A1* | 7/2003 | Muirhead et al. ......... 370/392 |
| 2003/0172114 | A1 | 9/2003 | Leung |
| 2003/0177221 | A1 | 9/2003 | Ould-Brahim et al. |
| 2003/0191937 | A1 | 10/2003 | Balissat et al. |
| 2003/0210705 | A1 | 11/2003 | Seddigh et al. |
| 2004/0037279 | A1 | 2/2004 | Zelig et al. |
| 2004/0042406 | A1 | 3/2004 | Wu et al. |
| 2004/0047342 | A1* | 3/2004 | Gavish et al. ............ 370/352 |
| 2004/0081154 | A1 | 4/2004 | Kouvelas |
| 2004/0151180 | A1 | 8/2004 | Hu et al. |
| 2004/0151181 | A1 | 8/2004 | Chu et al. |
| 2004/0165600 | A1* | 8/2004 | Lee .......................... 370/395.53 |
| 2004/0190517 | A1 | 9/2004 | Gupta et al. |
| 2004/0213160 | A1 | 10/2004 | Regan et al. |
| 2004/0218536 | A1 | 11/2004 | Yasukawa et al. |
| 2004/0240445 | A1 | 12/2004 | Shin et al. |
| 2004/0240446 | A1 | 12/2004 | Compton |
| 2005/0001720 | A1 | 1/2005 | Mason et al. |
| 2005/0013295 | A1 | 1/2005 | Regan et al. |
| 2005/0018693 | A1 | 1/2005 | Dull |
| 2005/0027782 | A1 | 2/2005 | Jalan et al. |
| 2005/0097203 | A1 | 5/2005 | Unbehagen et al. |
| 2005/0108419 | A1 | 5/2005 | Eubanks |
| 2005/0111351 | A1* | 5/2005 | Shen ...................... 370/217 |
| 2005/0129001 | A1 | 6/2005 | Backman et al. |
| 2005/0169270 | A1* | 8/2005 | Mutou et al. ............... 370/390 |
| 2005/0220132 | A1 | 10/2005 | Oman et al. |
| 2005/0232193 | A1 | 10/2005 | Jorgensen |
| 2005/0262232 | A1 | 11/2005 | Cuervo et al. |
| 2005/0265308 | A1 | 12/2005 | Barbir et al. |
| 2005/0271035 | A1 | 12/2005 | Cohen et al. |
| 2005/0271036 | A1 | 12/2005 | Cohen et al. |
| 2005/0281192 | A1 | 12/2005 | Nadeau et al. |
| 2006/0013141 | A1 | 1/2006 | Mutoh et al. |
| 2006/0039364 | A1 | 2/2006 | Wright |
| 2006/0047851 | A1 | 3/2006 | Voit et al. |
| 2006/0088031 | A1 | 4/2006 | Nalawade |
| 2006/0126496 | A1 | 6/2006 | Filsfils et al. |
| 2006/0147204 | A1 | 7/2006 | Yasukawa et al. |
| 2006/0153067 | A1 | 7/2006 | Vasseur et al. |
| 2006/0164975 | A1 | 7/2006 | Filsfils et al. |
| 2006/0182034 | A1 | 8/2006 | Klinker et al. |
| 2006/0221958 | A1 | 10/2006 | Wijnands et al. |
| 2007/0025277 | A1 | 2/2007 | Sajassi et al. |
| 2007/0036162 | A1 | 2/2007 | Tingle et al. |
| 2007/0076709 | A1 | 4/2007 | Mattson et al. |
| 2007/0098003 | A1 | 5/2007 | Boers et al. |
| 2007/0104119 | A1 | 5/2007 | Sarkar et al. |
| 2007/0124454 | A1 | 5/2007 | Watkinson |
| 2007/0140107 | A1 | 6/2007 | Eckert et al. |
| 2008/0056258 | A1 | 3/2008 | Sharma et al. |
| 2008/0123524 | A1 | 5/2008 | Vasseur et al. |
| 2008/0123654 | A1 | 5/2008 | Tse-Au |
| 2008/0291921 | A1 | 11/2008 | Du et al. |
| 2009/0028149 | A1 | 1/2009 | Yasukawa et al. |

FOREIGN PATENT DOCUMENTS

| | | |
|---|---|---|
| JP | 2005130258 A | 5/2005 |
| JP | 2005167482 A | 6/2005 |
| JP | 2005252385 A | 9/2005 |
| JP | 2005-323266 | 11/2005 |
| KR | 2004001206 | 1/2004 |
| WO | WO 02/091670 A2 | 11/2002 |
| WO | WO 2004/071032 A1 | 8/2004 |

OTHER PUBLICATIONS

Yasukawa et al. "Requirements for Point to Multipoint extension to RSVP-TE," IETF, Oct. 2003, pp. 1-20.

Atlas et al., "MPLS RSVP-TE Interoperability for Local Protection/ Fast Reroute," IETF, Jul. 2001, pp. 1-14.

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2pgs. Printed Apr. 18, 2005, http://www.javvin.com/protocolRSVPTE.html.

U.S. Appl. No. 11/212,509, entitled "Aggregate Multicast Trees for Multicast Virtual Private Networks," filed Aug. 26, 2005.

U.S. Appl. No. 11/212,500, entitled "Multicast Data Trees for Multicast Virtual Private Networks," filed Aug. 26, 2005.

U.S. Appl. No. 11/212,507, entitled "Reliable Exchange of Control Information for Multicast Virtual Private Networks," filed Aug. 26, 2005.

U.S. Appl. No. 11/213,636, entitled "Transport of Control and Data Traffic for Multicast Virtual Private Networks," filed Aug. 26, 2005.

U.S. Appl. No. 11/213, 638, entitled "Shared Multicast Trees for Multicast Virtual Private Networks," filed Aug. 26, 2005.

U.S. Appl. No. 11/212,475, entitled "Label Switching Multicast Trees for Multicast Virtual Private Networks," filed Aug. 26, 2005.

U.S. Appl. No. 11/212,932, entitled "Multicast Trees for Virtual Private Local Area Network (LAN) Service Multicast," filed Aug. 26, 2005.

U.S. Appl. No. 11/213,637, entitled "Aggregate Multicast Trees for Virtual Private Local Area Network (LAN) Service Multicast," filed Aug. 26, 2005.

U.S. Appl. No. 11/212,490, entitled "Multicast Data Trees for Virtual Private Local Area Network (LAN) Service Multicast," filed Aug. 26, 2005.

U.S. Appl. No. 11/213,639, entitled "Exchange of Control Information for Virtual Private Local Area Network (LAN) Service Multicast," filed Aug. 26, 2005.

U.S. Appl. No. 11/213,640, entitled "Auto-Discovery of Multicast Virtual Private Networks," filed Aug. 26, 2005.

U.S. Appl. No. 11/213,641, entitled "Inter-Autonomous System (AS) Multicast Virtual Private Networks," filed Aug. 26, 2005.

U.S. Appl. No. 11/056,383, entitled "Fast Reroute of Traffic Associated With a Point to Multi-Point Network Tunnel," filed Feb. 10, 2005, 29 pgs.

U.S. Appl. No. 11/215,813, entitled "Point to Multi-Point Label Switched Paths With Label Distribution Protocol," filed Aug. 29, 2005, 25 pgs.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

K. Kompella et al., "Virtual Private LAN Service," draft-ietf-l2vpn-vpls-bgp-00.txt, May 2003, 22 pgs.

Y. Rekhter et al., "A Border Gateway Protocol 4 (BGP-4)," Mar. 1995, 72 pgs.

L. Martini et al., "Transport of Layer 2 Frames Over MPLS," Network Working Group Internet Draft, draft-martini-l2circuit-trans-mpls-08.txt, Nov. 2001, 18 pgs.

L. Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

Aggarwal et al., "MPLS Upstream Label Assignment for RSVP-TE and LDP," Aug. 24, 2005, http://www.tla-group.com/~mpls/ietf-63-mpls-upstream-rsvp-ldp.ppt, 8 pgs.

Fujita, N., "Dynamic Selective Replication Schemes for Content Delivery Networks," IPSJ SIG Notes, vol. 2001, No. 111, Information Processing Society of Japan, Nov. 21, 2001, 2 pgs.

Aggarwal et al., "MPLS Upstream Label Assignment and Context Specific Label Space," Network Working Group Internet Draft, draft-raggarwa-mpls-upstream-label-00.txt, Jan. 2005, 9 pgs.

Wijnands et al., "Multicast Extensions for LDP," Network Working Group Internet Draft, draft-wijnands-mpls-ldp-mcast-ext-00.txt, Mar. 2005, 13 pgs.

Office Action from U.S. Appl. No. 11/566,480, dated Nov. 27, 2009, 36 pp.

Response to Office Action dated Nov. 27, 2009, for U.S. Appl. No. 11/566,480, filed Jan. 22, 2010, 18 pp.

Office Action from U.S. Appl. No. 11/213,638, dated Dec. 14, 2009, 26 pp.

Response to Office Action dated Dec. 14, 2009, from U.S. Appl. No. 11/213,638, filed Feb. 16, 2010, 6 pp.

Office Action from U.S. Appl. No. 11/213,640, dated Dec. 24, 2009, 26 pp.

Response to Office Action dated Dec. 24, 2009, from U.S. Appl. No. 11/213,640, filed Mar. 24, 2010, 13 pp.

Satyanarayana et al., "Extension to GMPLS RSVP Graceful Restart", draft-aruns-ccamp-restart-ext-01.txt, Jul. 2004, Network Working Group Internet Draft, 23 pgs.

* cited by examiner

TRANSMISSION OF LAYER TWO (L2) MULTICAST TRAFFIC OVER MULTI-PROTOCOL LABEL SWITCHING NETWORKS

TECHNICAL FIELD

The invention relates to computer networks and, more particularly, to transmission of multicast traffic within a computer network.

BACKGROUND

Customer networks are networks established by individuals or companies for internal communication. Customer networks may include local area networks (LANs) or wide area networks (WANs) that comprise a plurality of subscriber devices, such as personal computers, laptops, workstations, personal digital assistants (PDAs), wireless devices, network-ready appliances, file servers, print servers or other devices. The customer networks may meet customer-specific needs using a number of different communication protocols, such as Asynchronous Transfer Mode (ATM) protocol, Ethernet protocol, Bridged Ethernet protocol, Frame Relay protocols, or other Layer 2 communication protocols. Such protocols may transfer information in fixed-length data units, such as frames or cells.

To transfer the data units, switches within a customer network often create a fixed network path, referred to as a virtual circuit. The frames transmitted by a source device within the customer network travel along the virtual circuit created by the switches. A destination device receives the data units from the virtual circuit, and reassembles the information from the data units.

Another popular network technology is the Internet Protocol (IP) networking protocol in which information is divided into variable-length blocks called packets. In contrast to fixed data unit protocols, such as ATM, IP-based networks individually route these packets, also referred to as datagrams, across the network from a source device to a destination device. In other words, unlike the virtual circuits within a customer network, each packet can take a different route from the source to the destination device within the IP network. The destination device reorders the packets upon receipt, extracts the information from the packets, and assembles the information into its original form.

In order to allow remote customer networks to communicate, IP-based communication techniques are being developed that relay frames through one or more intermediate IP network, such as the Internet. According to the techniques, routing devices near an edge of the IP network, often referred to as edge routers, can receive frames from one of the customer networks via an L2 protocol, encapsulate the frames within packets, and route the packets through the IP network to the other customer network. Routing devices within the IP network maintain tables of routing information that describe available routes through the network. Upon receiving an incoming packet, the routing device examines information within the packet and forwards the packet in accordance with the routing information. Some conventional systems use Multi-protocol Label Switching (MPLS) protocols to transport the L2 traffic through the intermediate networks. MPLS is a mechanism used to engineer traffic patterns within Internet Protocol (IP) networks. By utilizing MPLS, a source network device can request a path through a network, i.e., a Label Switched Path (LSP), to carry MPLS packets from the source network device to a destination network device.

In some cases, a router within an IP network may receive a join request for a multicast group from a subscriber device within a customer network. When the router receives the L2? multicast traffic associated with the multicast group from a source network, the router forwards the multicast traffic to the requesting subscriber device. When two or more subscriber devices connected to the same router request to join the same multicast group, the source device sends an identical copy of the associated multicast traffic to the router for each of the requesting subscriber devices over the same connection. This is not bandwidth efficient as multicast traffic typically comprises high bandwidth data, audio, or video streams.

SUMMARY

In general, the principles of the invention allows point to multi-point (P2MP) LSPs to be used for L2 multicast transmission. In this way, principles of the invention provide for the migration of legacy L2 networks to MPLS networks that utilize P2MP LSPs. The MPLS networks may include traffic engineering (TE) capabilities that provide bandwidth management and quality of service (QoS).

The principles of the invention include configuring circuit cross-connect (CCC) switches that transparently cross-connect L2 interfaces to one or more P2MP LSPs within an MPLS network. The transparent cross-connections allow L2 multicast traffic to be encapsulated as MPLS packets regardless of the type of payload the L2 multicast traffic is carrying. For example, a CCC switch may be configured within an ingress router of a P2MP LSP to cross connect an L2 interface from a multicast source network to the P2MP LSP. CCC switches may also be configured within each egress router of the P2MP LSP to cross-connect each leaf of the P2MP LSP to one or more L2 interfaces for customer networks.

A plurality of subscriber devices within a L2 customer network may request the same multicast traffic from a L2 multicast source network. The principles of the invention described herein substantially eliminate the use of ingress replication to carry L2 multicast traffic across an MPLS network. Ingress replication may cause congestion in the MPLS network due to transmitting multiple copies of the high bandwidth data, audio, or video streams that typically comprise multicast traffic. By cross-connecting an L2 interface of an ingress router of a P2MP LSP directly to the P2MP LSP, only a single copy of the multicast traffic is sent by the ingress router. The multicast traffic may be duplicated as necessary at transit routers of the P2MP LSP so as to substantially eliminate duplicate multicast traffic on the same physical connection.

In one embodiment, a method comprises establishing a P2MP label switched path LSP having a source device and multiple receiver devices within a computer network, configuring a CCC switch within the source device that cross-connects an ingress L2 interface to the P2MP LSP, and configuring a CCC switch within each of the multiple receiver devices, wherein each of the CCC switches cross-connects the P2MP LSP to at least one egress Layer 2 interface.

In another embodiment, a network device comprises a signaling protocol that establishes a P2MP LSP through a computer network, at least one Layer 2 interface card that receives at least one L2 interface, and a CCC module that configures a CCC switch that cross-connects the at least one L2 interface to the P2MP LSP.

In a further embodiment, a computer-readable medium comprises instructions that cause a programmable processor to establish a P2MP LSP having a source device and multiple receiver devices within a computer network, configure a CCC switch within the source device that cross-connects an ingress L2 interface to the P2MP LSP, and configure a CCC switch within each of the multiple receiver devices, wherein each of the CCC switches cross-connects the P2MP LSP to at least one egress L2 interface.

An another embodiment, a system comprises a signaling protocol that establishes a P2MP LSP through a computer network, a source device of the P2MP LSP that includes CCC switch that cross-connects an ingress Layer 2 interface to the P2MP LSP, and multiple receiver devices of the P2MP LSP, wherein each of the multiple receiver devise includes a CCC switch that cross-connects the P2MP LSP to at least one egress Layer 2 interface.

The details of one or more embodiments of the principles of the invention are set forth in the accompanying drawings and the description below. Other features, objects, and advantages of the invention will be apparent from the description and drawings, and from the claims.

DETAILED DESCRIPTION

Figure 1:
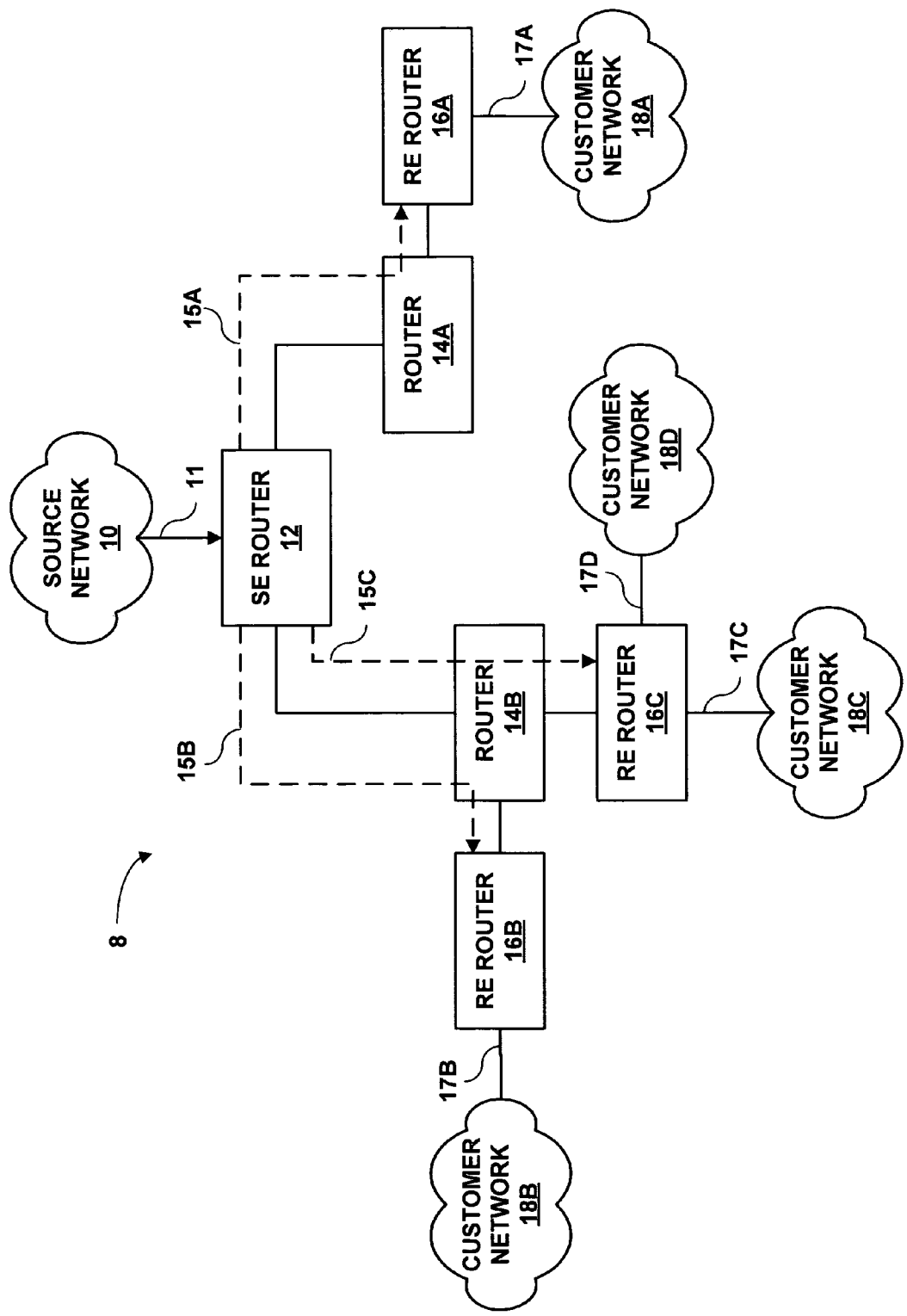
FIG. 1 is a block diagram illustrating an exemplary computer system in which layer two (L2) multicast traffic is transmitted across a Multi-protocol Label Switching (MPLS) network in accordance with the principles of the invention.

FIG. 1 is a block diagram illustrating an exemplary computer system in which Layer 2 (L2) multicast traffic is transmitted across a Multi-protocol Label Switching (MPLS) network 8 in accordance with the principles of the invention. In this example, MPLS network 8 includes a point to multi-point (P2MP) label switched path (LSP) 15 established between a source edge (SE) router 12 (also referred to as a SE network device) and multiple receiver edge (RE) routers 16A-16C ("RE routers 16") (also referred to as a RE network devices). Circuit cross-connect (CCC) switches are established within SE router 12 and each of RE routers 16 to allow L2 multicast traffic to be encapsulated as MPLS packets and transmitted across MPLS network 8 via P2MP LSPs. In this way, the invention is capable of migrating legacy L2 networks to MPLS networks In the illustrated embodiment, a source network 10 couples to SE router 12 of MPLS network 8 via an L2 interface 11. Source network 10 may comprise any public or private network that transmits L2 multicast traffic, such as high bandwidth data, audio, or video streams. Customer networks 18A-18D ("customer networks 18") couple to RE routers 16 via L2 interfaces 17A-17D ("L2 interfaces 17"). Customer networks 18 may include local area networks (LAN) or wide area networks (WAN) that comprise a plurality of subscriber devices, such as personal computers, laptops, workstations, personal digital assistants (PDAs), wireless devices, network-ready appliances, file servers, print servers or other devices.

Source network 10 and customer networks 18 may use non-IP protocols, such as Asynchronous Transfer Mode (ATM) protocol, Ethernet protocol, Bridged Ethernet protocol, Frame Relay protocols, or other L2 communication protocols. For example, source network 10 and customer networks 18 may use the ATM communication protocol. The ATM protocol communicates information in fixed or variable-sized data units, referred to as frames. In this case, L2 interface 11 may comprise an ATM virtual circuit over which source network 10 communicates the frames to SE router 12. L2 interfaces 17 may also comprise ATM virtual circuits over which RE routers 16 communicate frames to customer networks 18.

MPLS network 8 includes SE router 12, transit routers 14A and 14B, and RE routers 16. In the example of FIG. 1, SE router 12 uses RSVP-TE to establish point-to-point (P2P) LSPs to carry traffic between SE router 12 and each of RE routers 16 over routers 14A and 14B. A P2P LSP 15A is established between SE router 12 and RE router 16A coupled to customer network 18A via L2 interface 17A. A P2P LSP 15B is also established between SE router 12 and RE router 16B coupled to customer network 18B via L2 interface 17B. In addition, a P2P LSP 15C is established between SE router 12 and RE router 16C coupled to customer network 18C via L2 interface 17C and customer network 18D via L2 interface 17D.

P2MP LSP 15 is setup by merging the individual P2P LSPs 15A-15C and relying on multicast capabilities of MPLS network 8. P2P LSPs 15A-15C that are merged to form P2MP LSP 15 may be referred to as branch LSPs. The branch LSPs are initiated by SE router 12. Hence P2MP LSP 15 is as efficient as trees setup by a multicast routing protocol in an IP network. However, P2MP LSP 15 is achieved without burdening RSVP-TE with any of the mechanisms of a multicast routing protocol. As a result, routers 12, 14, and 16 within MPLS network 8 need not run a multicast routing protocol to support multicast traffic.

A CCC switch (not shown in FIG. 1) is configured within the ingress router of P2MP LSP 15 (i.e., SE router 12) to transparently connect L2 interface 11 to P2MP LSP 15. CCC switches are also configured within each egress router of P2MP LSP 15 (i.e., RE routers 16) to transparently connect each leaf of P2MP LSP 15 to L2 interfaces 17. The CCC switches may be viewed as logical cross-connections for delivering L2 traffic to LSPs. The transparent cross-connections allow L2 multicast traffic to be encapsulated as MPLS packets regardless of the type of payload the L2 multicast traffic is carrying. More specifically, SE router 12 may route frames through MPLS network 8 by pre-pending MPLS headers on sets of frames to form MPLS packets.

Upon receiving frames or other data units from source network 10, for example, SE router 12 constructs an MPLS packet that includes one or more frames. SE router 12 routes the packet through MPLS network 8 to RE routers 16 via P2MP LSP 15. RE routers 16 disassemble the MPLS packets into individual frames, and forward the frames to their respective customer networks 18. Routers 14A and 14B within MPLS network 8 forward the MPLS packets without regard to the content of the frames. In this manner, routers 14A and 14B may relay frames of any type, including data and control frames, and need not disassemble or reassemble the information carried by the frames.

SE router 12, routers 14, and RE routers 16 maintain routing information that describes available routes through MPLS network 8. For example, the routing information may include the route of P2MP LSP 15. Upon receiving an incoming packet, the routers examine information within the packet and forward the packet in accordance with the routing information. In the case of a MPLS packet, the routers examine a label pushed onto the MPLS packet and swap the label based on the routing information. In order to maintain an accurate representation of network 8, the routers exchange routing information, e.g., bandwidth availability of links, in accordance with a defined routing protocol, such as an Interior Gateway Protocol (IGP).

Subscriber devices within customer networks 18 may send requests to join specific multicast groups to source network 10 over MPLS network 8. Source network 10 then forwards a single stream of the L2 multicast traffic associated with each of the requested multicast groups to SE router 12. SE router 12 cross-connects L2 interface 11 from source network 10 to P2MP LSP 15 via the CCC switch. SE router 12 encapsulates the L2 multicast traffic in MPLS packets and forwards the packets to customer networks 18 via P2MP LSP 15.

When subscriber devices with each of customer networks 18 request memberships in the same multicast group, SE router 12 may forward a copy of the associated multicast traffic encapsulated in a MPLS packet to both transit routers 14A and 14B. Transit router 14A may simply forward the MPLS packet along branch LSP 15A to RE router 16A. RE router 16A retrieves the L2 multicast traffic encapsulated in the MPLS packet and forwards the multicast stream to the requesting subscriber devices within customer network 18A over L2 interface 17A.

Transit router 14B, on the other hand, is responsible for replicating the MPLS packet when customer networks coupled to both RE router 16B and 16C request the same multicast traffic. Transit router 14B forwards one copy of the MPLS packet along branch LSP 15B to RE router 16B and forwards an identical copy of the MPLS packet along branch LSP 15C to RE router 16C. RE router 16B retrieves the L2 multicast traffic encapsulated in the MPLS packet and forwards the multicast stream to the requesting subscriber devices within customer network 18B over L2 interface 17B. RE router 16C retrieves the L2 multicast traffic encapsulated in the MPLS packet and forwards the multicast stream to the requesting subscriber devices within customer network 18C over L2 interface 17C and to the requesting subscriber devices within customer network 18D over L2 interface 17D.

Figure 2:
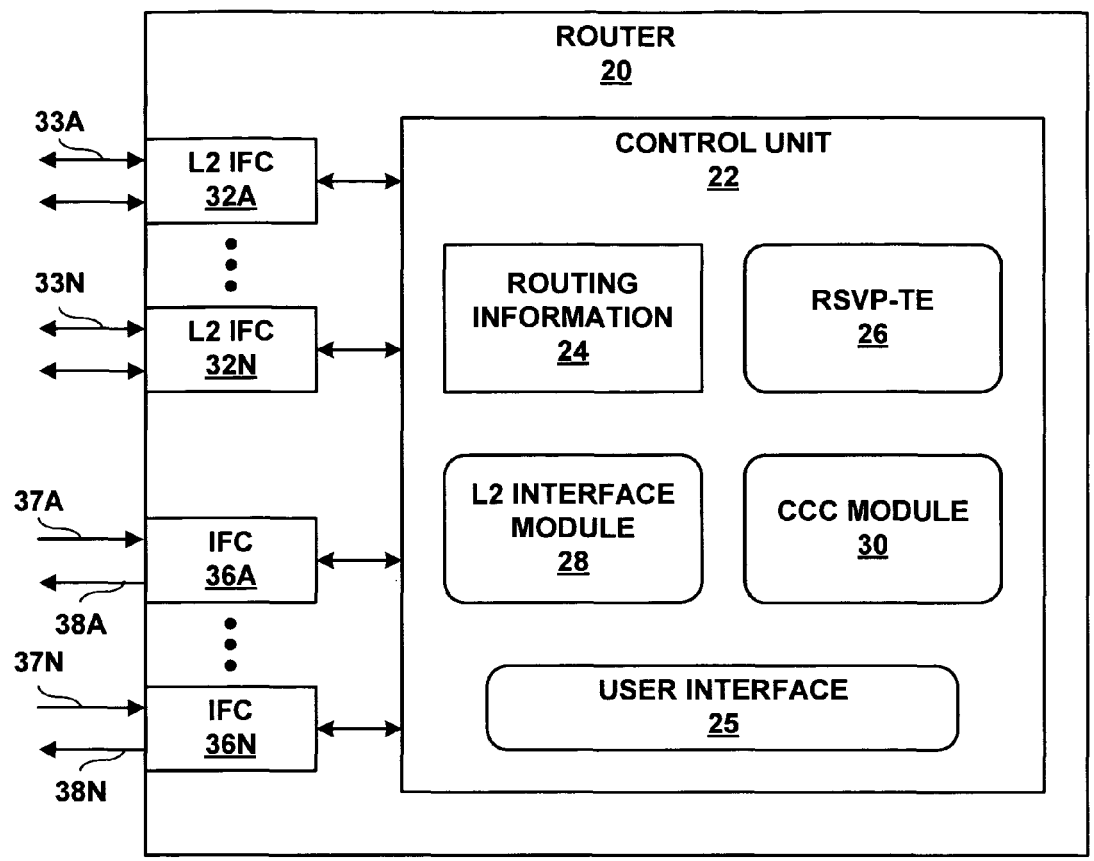
FIG. 2 is a block diagram illustrating an exemplary router that enables L2 multicast traffic to be transmitted across an MPLS network as described herein.

FIG. 2 is a block diagram illustrating an exemplary router 20 that enables L2 multicast traffic to be transmitted across an MPLS network consistent with the principles of the invention. For example, router 20 may be an ingress router (i.e., a source network device) of a P2MP LSP established across an MPLS network. Router 20 may also be one of multiple egress routers (i.e., destination network devices) of the P2MP LSP. Router 20 may operate substantially similar to SE router 12 or one of RE routers 16 within MPLS network 8 from FIG. 1.

In the illustrated embodiment, router 20 includes a set of interface cards (IFCs) 36A-36N ("IFCs 36") for communicating packets between router 20 and an MPLS network via inbound links 37A-37N ("inbound links 37") and outbound links 38A-38N ("outbound links 38"). IFCs 37 are typically coupled to links 37 and 38 via one or more interface ports. Furthermore, router 20 includes a set of L2 IFCs 32A-32N ("L2 IFCs 32") for communicating frames between router 20 and L2 networks via L2 interfaces 33A-33N ("L2 interfaces 33"). For example, at least one of L2 IFCs 32 may be an ATM interface card for communicating ATM frames (or cells) via virtual circuits 33.

Router 20 further comprises a control unit 22 that includes an L2 interface module 28. L2 interface module 28 maintains a record of L2 interfaces 33 on which router 20 receives L2 traffic via L2 IFCs 32. In some cases, L2 interfaces 33 may carry multicast group join requests from router 20 to a L2 multicast source network. L2 interfaces 33 may then, in turn, carry L2 multicast traffic associated with the requested multicast groups. L2 interface module 28 may map each of L2 interfaces 33 to a specific multicast group Control unit 22 also maintains routing information 24. Routing information 24 describes the topology of a network and, in particular, routes through the network. Routing information 24 may include, for example, route data that describes various routes within the network, and corresponding next hop data indicating appropriate neighboring devices within the network for each of the routes. Router 20 updates routing information 24 to accurately reflect the topology of the network. In general, when router 20 receives a packet via one of inbound links 37, control unit 22 determines a destination and associated next hop for the packet in accordance with routing information 24 and outputs the packet on one of outbound links 38 based on the destination.

In the example of FIG. 2, control unit 22 provides an operating environment for a resource reservation protocol with traffic engineering 26 ("RSVP-TE 26") to execute within control unit 22. In other embodiments, other protocols may be executed within control unit 22, such as the label distribution protocol (LDP). RSVP-TE 26 receives resource reservation requests from other routing devices, and reserves the requested bandwidth on outbound links 38 for RSVP-TE traffic. In the event traffic needs to be rerouted around a network failure or a congested link, for example, a system administrator or software agent invokes RSVP-TE 26 to traffic engineer a new path through the network and establish the LSP. Although described for exemplary purposes in reference to RSVP-TE, the principles described herein may by applied to extend other protocols, such as different constraint-based routing protocols.

RSVP-TE 26 provides signaling mechanisms for establishing individual branch LSPs and merging the branch LSPs to form a P2MP LSP within an MPLS network. In this way, RSVP-TE 26 may establish a P2MP LSP from a SE router to multiple RE routers substantially similar to P2MP LSP 15 from FIG. 1. The route data associated with the P2MP LSP is added to routing information 24 in order to accurately reflect the topology of the MPLS network.

CCC module 30 establishes and configures logical CCC switches to cross-connect one or more of L2 interfaces 33 to a P2MP LSP established by RSVP-TE 26. CCC module 30 may configure the CCC switches based on configuration information provided by a user. For example, a user may specify the configuration information for router 20 via a user interface 25 included within control unit 22. User interface 25 may include a display, a keyboard, a mouse or any other type of input device. CCC module 30 may also communicate with L2 interface module 28 to determine which one of L2 interfaces 33 is mapped to a specific multicast group. CCC module 30 cross-connects L2 interfaces 33 to network links 37, 38 associated with P2MP LSPs to enable L2 multicast traffic to be transmitted across the MPLS network.

In the case where router 20 comprises an ingress router of the P2MP LSP, CCC module 30 configures a CCC switch that logically cross-connects the one of L2 interfaces 33 on which router 20 receives L2 multicast traffic from a source network to the transmitting P2MP LSP. The CCC switch is capable of mapping the L2 multicast traffic received on the one of L2 interfaces 33 to a specific one of outgoing links 38 associated with the P2MP LSP. CCC module 30 may receive configuration information from user interface 25 that includes a name for the ingress CCC switch (p2 mp_transmit_switch [name]), the name of the ingress L2 interface (input_interface [name]), and the name of the transmitting P2MP LSP (transmit_p2 mp_lsp [name]).

Upon receiving the L2 multicast traffic from the source network on the specific one of L2 interfaces 33 via L2 IFCs 32, control unit 22 sends the L2 multicast traffic to CCC module 30. CCC module 30 encapsulates the L2 multicast traffic in a MPLS packet regardless of the type of payload the L2 multicast traffic is carrying. CCC module 30 then forwards the MPLS packet onto the P2MP LSP according to the CCC switch. More specifically, control unit 22 forwards the MPLS packet on the one of outgoing links 38 associated with the P2MP LSP via IFCs 36.

In the case where the P2MP LSP branches to multiple transit routers from the ingress router, as shown in FIG. 1, the CCC switch is capable of mapping the L2 multicast traffic to two or more of outgoing links 38 associated with the P2MP LSP. Therefore, router 20 encapsulates the L2 multicast traffic received on the appropriate one of L2 interfaces 33 via L2 IFCs 32 in a MPLS packet, replicates the MPLS packet, and forwards one copy of the MPLS packet on each of the associated outgoing links 38 via IFCs 36.

In the case when router 20 comprises one of the multiple egress routers of the P2MP LSP, CCC module 30 configures a CCC switch that cross-connects a leaf of the receiving P2MP LSP to one of L2 interfaces 33 coupled to a customer network that includes subscriber devices requesting the L2 multicast traffic. The CCC switch is capable of mapping MPLS packets received on the one of incoming links 37 associated with the P2MP LSP to a specific one of L2 interfaces 33. In this case, CCC module 30 may receive configuration information from user interface 25 that includes a name for the egress CCC switch (p2 mp_receive_switch [name]), the name of the egress L2 interface (output_interface [name]), and the name of the receiving P2MP LSP (transmit_p2 mp_lsp [name]).

Upon receiving the MPLS packet from the P2MP LSP on the one of incoming links 37 via IFCs 36, control unit 22 sends the MPLS packet to CCC module 30. CCC module 30 retrieves the L2 multicast traffic from the MPLS packet. CCC module 30 then forwards the L2 multicast traffic onto one of L2 interfaces 33 according to the CCC switch. More specifically, control unit 22 forwards the L2 multicast traffic to a customer network on a specific one of L2 interfaces 33 via L2 IFCs 32.

In the case where more than one customer network is coupled to the egress routers of the P2MP LSP, as shown in FIG. 1, the CCC switch may map the MPLS packet from the P2MP LSP to two or more of L2 interfaces 33. Router 20 retrieves the L2 multicast traffic from the MPLS packet received on one of incoming links 37 via IFCs 36, replicates the L2 multicast traffic, and forwards one copy of the L2 multicast traffic on each of the L2 interfaces 33 via L2 IFCs 32.

The architecture of router 20 illustrated in FIG. 2 is shown for exemplary purposes only. The invention is not limited to this architecture. In other embodiments, router 20 may be configured in a variety of ways. In one embodiment, for example, some of the functionally of control unit 22 may be distributed within IFCs 36 or L2 IFCs 32. In another embodiment, control unit 22 may include a routing engine that performs routing functions and maintains a routing information base (RIB), e.g., routing information 24, and a forwarding engine that performs packet forwarding based on a forwarding information base (FIB) generated in accordance with the RIB.

Control unit 22 may be implemented solely in software, or hardware, or may be implemented as a combination of software, hardware, or firmware. For example, control unit 22 may include one or more processors which execute software instructions. In that case, the various software modules of control unit 22, such as RSVP-TE 26, may comprise executable instructions stored on a computer-readable medium, such as computer memory or hard disk.

Figure 3:
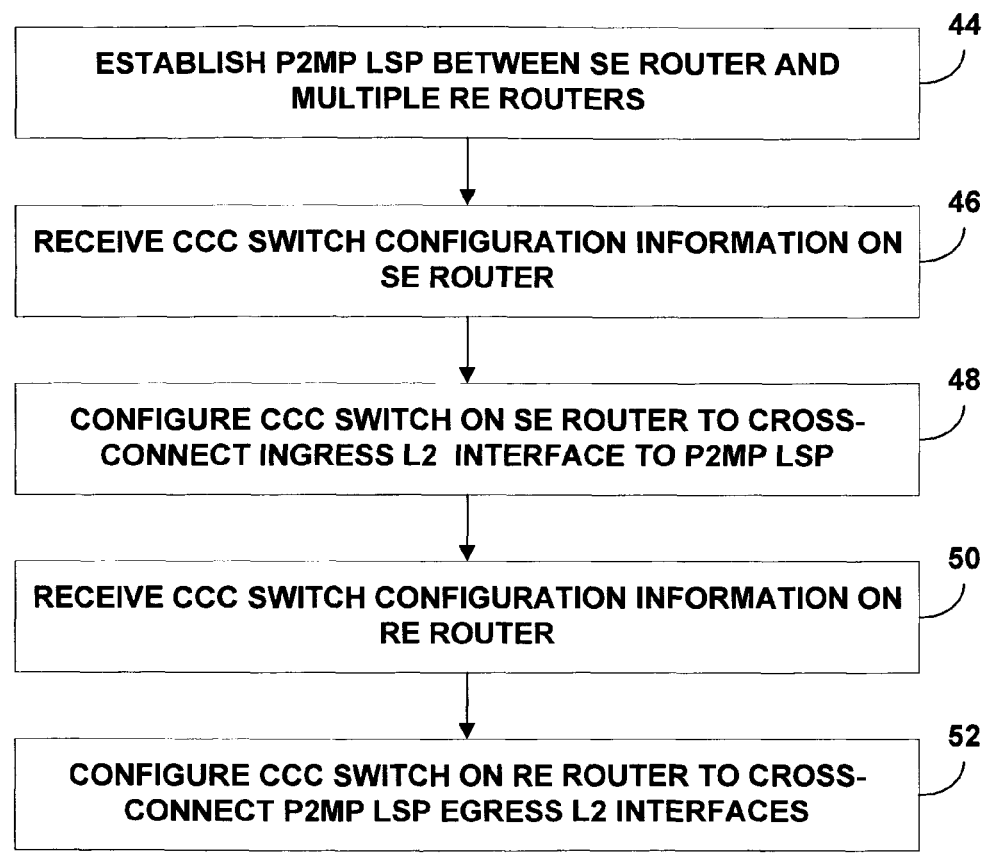
FIG. 3 is a flow chart illustrating an exemplary process of configuring network devices within an MPLS network to transmit L2 multicast traffic across the MPLS network.

FIG. 3 is a flow chart illustrating an exemplary process of configuring network devices within an MPLS network to transmit L2 multicast traffic across the MPLS network. The network devices may comprise either a SE router (i.e., a source network device) of a P2MP LSP or one of multiple RE routers (i.e., receiver network devices) of the P2MP LSP. The network devices may be substantially similar to router 20 illustrated in FIG. 2.

Each of the network devices includes a signaling protocol that establishes the P2MP LSP between the SE router and the multiple RE routers (44). For example, the signaling protocol may comprise RSVP-TE. RSVP-TE may be used to set up several branch LSPs between the SE router and each of the RE routers separately. RSVP-TE then merges the branch LSPs into a single P2MP LSP. The route data of the P2MP LSP is then added to routing information included within the network devices in order to accurately reflect the topology of the MPLS network.

The SE router of the P2MP LSP receives ingress CCC switch configuration information from a user via a user interface or via a software agent (46). A CCC module within the SE router uses the configuration information to configure a CCC switch that cross-connects an ingress L2 interface to the P2MP LSP (48). The configuration information may include a name for the ingress CCC switch and names of the ingress L2 interface and the transmitting P2MP LSP to be cross-connected.

Each of the multiple RE routers of the P2MP LSP receives egress CCC switch configuration information from a user via a user interface or from an automated software agent (50). A CCC module within each of the RE routers uses the configuration information to configure a CCC switch that cross-connects the P2MP LSP to at least one egress L2 interface (52). The configuration information may include a name for the egress CCC switch and names of the receiving P2MP LSP and the egress L2 interfaces to be cross-connected.

Figure 4:
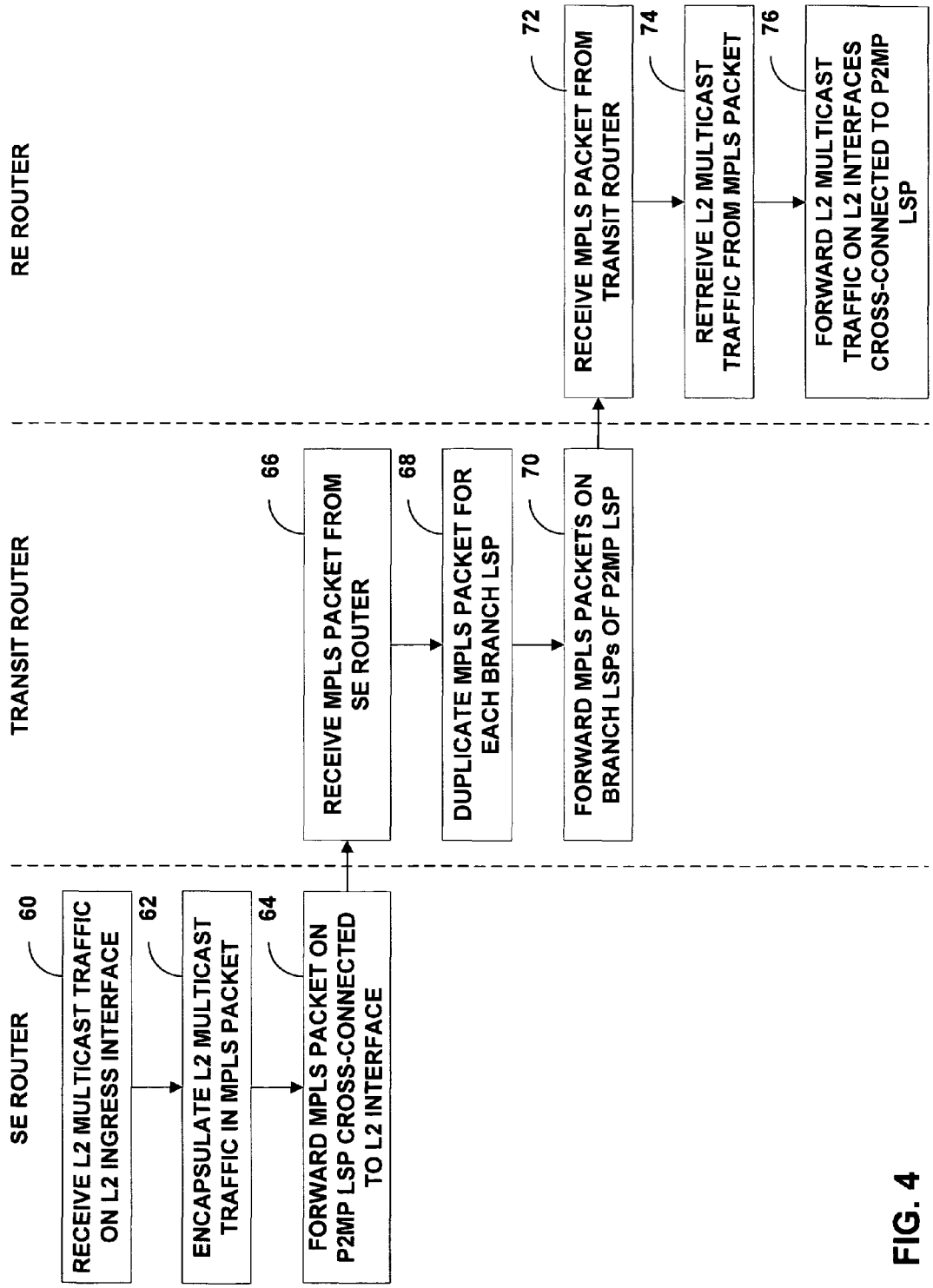
FIG. 4 is a flowchart illustrating an exemplary process of transmitting L2 multicast traffic across an MPLS network.

FIG. 4 is a flowchart illustrating an exemplary process of transmitting L2 multicast traffic across an MPLS network. For exemplary purposes, the process is described relative to MPLS network 8 illustrated in FIG. 1. MPLS network 8 includes P2MP LSP 15 from SE router 12 to multiple RE routers 16. L2 multicast source network 10 couples to SE router 12 via L2 interface 11. Customer networks 18 couple to RE routers 16 via L2 interfaces 17. Each of customer networks 18 may include a plurality of subscriber devices. CCC switches are configured within SE router 12 and each of RE routers 16 to cross-connect the L2 interfaces to P2MP LSP 15.

SE router 12 receives L2 multicast traffic from source network 10 on L2 interface 11 (60). A CCC switch within SE router 12 encapsulates the L2 multicast traffic into a MPLS packet (62) by pre-pending a MPLS header to the set of frames. SE router 12 then forwards the MPLS packet according to the CCC switch. Specifically, SE router 12 forwards the MPLS packet on P2MP LSP 15 which is cross-connected to L2 interface 11 via the CCC switch (64). SE router 12 pushes a forwarding label onto the MPLS packet that identifies the next hop along P2MP LSP 15.

The MPLS packet is transmitted to one of transit routers 14A and 14B based on the label affixed to the MPLS packet. Transit router 14B, for example, receives the MPLS packet from SE router 12 (66). Transit router 14B may forward the MPLS packet without regard to the L2 multicast content encapsulated within the packet. In this manner, router 14B need not disassemble the MPLS packet to retrieve the L2 multicast data.

In the embodiment illustrated in FIG. 1, branch LSPs 15B and 15C of P2MP LSP 15 separate at transit router 14B. Therefore, transit router 14B determines whether both RE router 16B and RE router 16C requested the multicast traffic encapsulated in the MPLS packet. If both RE routers 16B and 16C requested the multicast traffic, transit router 14 duplicates the MPLS packet for each branch LSP (68).

Transit router 14B then forwards a copy of the MPLS packet on each of branch LSPs 15B and 15C of P2MP LSP 15 (70). Transit router 14B pushes a forwarding label onto the first copy of the MPLS packet that identifies the next hop along branch LSP 15B. Transit router 14B also pushes a forwarding label onto the second copy of the MPLS packet that identifies the next hop along branch LSP 15C. In the embodiments described herein, RSVP-TE may establish P2MP LSP 15 with penultimate hop popping turned off such that each RE router 16 advertises a non-null label.

The MPLS packets are transmitted to RE routers 16B and 16C based on the labels affixed to the MPLS packets. RE router 16C, for example, receives one of the MPLS packets from transit router 14B (72). RE router 16C disassembles the MPLS packet and retrieves the L2 multicast traffic encapsulated in the MPLS packet (74). In the embodiment illustrated in FIG. 1, both customer networks 18C and 18D are coupled to RE router 16C. Therefore, RE router 16C determines whether both customer network 18C and customer network 18D include subscriber device that requested the multicast traffic. If both customer networks 18C and 18D requested the multicast traffic, RE router 16C duplicates the L2 multicast traffic for each customer network.

RE router 16C then forwards the identical copies of the L2 multicast traffic according to the CCC switch configured within RE router 16C by forwarding the L2 multicast traffic on L2 interfaces 17C and 17D which are cross-connected to P2MP LSP 15 (76). Customer networks 18C and 18D are then responsible for transmitting the L2 multicast traffic from the L2 interfaces to each requesting subscriber device within the customer networks.

Various embodiments of the invention have been described. These and other embodiments are within the scope of the following claims.

The invention claimed is:

1. A method comprising:
    establishing a plurality of branch label switched paths (LSPs), wherein each of the branch LSPs have a same source device and a different one of multiple receiver devices within a computer network, and wherein two or more of the branch LSPs are configured to operate over a single physical interface of the source device;
    merging, at the source device, the plurality of branch LSPs to establish a point to multi-point (P2MP) LSP having the source device and the multiple receiver devices, wherein the source device provides an ingress for the P2MP LSP, and wherein each of the multiple receiver devices provides at least one of multiple egresses for the P2MP LSP;
    connecting an ingress layer two (L2) interface to the P2MP LSP with a circuit cross-connect (CCC) switch within the source device such that the ingress L2 interface is connected to the single physical interface;
    receiving a L2 multicast data unit on the ingress L2 interface of the source device;
    encapsulating the L2 multicast data unit in a packet; and
    forwarding only a single copy of the packet on the physical interface for transmission to the multiple receiver devices via the P2MP LSP connected to the ingress L2 interface.

2. The method of claim 1, wherein the CCC switch comprises a first ingress CCC switch and the method further comprising connecting the P2MP LSP to at least one egress L2 interface using a second egress CCC switch included within one of the multiple receiver devices.

3. The method of claim 2, wherein connecting the P2MP LSP to the least one egress L2 interface comprises mapping packets received on an incoming link of the receiver device associated with the P2MP LSP to the at least one egress L2 interface.

4. The method of claim 2, further comprising configuring the first CCC switch within the source device in response to configuration data received from a user or a software agent.

5. The method of claim 4, wherein the configuration data specifies a first name for the ingress CCC switch, a second name of the ingress L2 interface, and a third name of the P2MP LSP.

6. The method of claim 2, further comprising configuring the second CCC switch included within the one of the multiple receiver devices in response to configuration data received from a user or a software agent.

7. The method of claim 6, wherein the configuration data specifies a first name for the egress CCC switch, a second name of the at least one egress L2 interface, and a third name of the P2MP LSP.

8. The method of claim 1, wherein the packet comprises a Multi-protocol Label Switching (MPLS) packet.

9. The method of claim 1, wherein the L2 multicast data unit comprises high bandwidth data, audio or video streams.

10. The method of claim 1, further comprising:
    receiving the packet from the P2MP LSP on one of the multiple receiver devices;
    retrieving wherein the L2 multicast data unit encapsulated within the packet; and
    forwarding wherein the L2 multicast data unit on the at least one egress L2 interfaces cross-connected to the P2MP LSP.

11. The method of claim 1, further comprising:
    transporting L2 multicast traffic via the P2MP LSP; and
    duplicating the L2 multicast traffic at an intermediate device associated with the P2MP LSP when two or more of the plurality of branch LSPs that were merged to form the P2MP LSP originate at the intermediate device.

12. The method of claim 1, further comprising:
    transporting L2 multicast traffic via the P2MP LSP; and
    duplicating the L2 multicast traffic at one of the receiver devices when two or more egress L2 interfaces of the receiver device are cross-connected to the P2MP LSP.

13. The method of claim 1, wherein connecting the ingress L2 interface to the P2MP LSP comprises mapping L2 multicast traffic received on the ingress L2 interface to at least one outgoing network link of the source device associated with the P2MP LSP.

14. The method of claim 1, wherein the computer network comprises a Multi-protocol Label Switching (MPLS) network.

15. The method of claim 1, wherein the ingress L2 interface couples an L2 multicast source network to the source device.

16. The method of claim 1, wherein the at least one egress L2 interface couples one of the multiple receiver devices to at least one L2 customer network.

17. The method of claim 1, wherein the source device and the receiver devices are routers.

18. The method of claim 1, wherein merging the plurality of branch LSPs to establish the point to multi-point (P2MP) LSP further comprises merging the plurality of branch LSPs to establish the point to multi-point (P2MP) LSP with penultimate hop popping turned off such that each of the multiple receiver devices advertises a non-null label.

19. A network device comprising:
at least one signaling protocol that establishes a plurality of branch label switched paths (LSPs), wherein each of the branch LSPs have a same source device and a different one of multiple receiver devices within a computer network, and wherein two or more of the branch LSPs are configured to operate over a single physical interface of the source device,
wherein the at least one signaling protocol merges the plurality of branch LSPs to establish a point to multi-point (P2MP) LSP through the computer network, wherein the source device of the computer network provides an ingress for the P2MP LSP and each of the multiple receiver devices of the computer network provides at least one of multiple egresses for the P2MP LSP;
at least one layer two (L2) interface card having an L2 interface; and
a circuit cross-connect (CCC) module that cross-connects the L2 interface to the P2MP LSP such that the L2 interface is connected to the single physical interface,
wherein the network device comprises the source device of the P2MP LSP, and
wherein the CCC module receives L2 multicast data unit on the L2 interface, encapsulates wherein the L2 multicast data unit in a packet for output on the P2MP LSP and forwards only a single copy of the packet on the physical interface for transmission to the multiple receiver devices via the P2MP LSP connected to the L2 interface.

20. The network device of claim 19, wherein the packet comprises a Multi-protocol Label Switching (MPLS) packet.

21. The network device of claim 19,
wherein one of the multiple receiver devices associated with a leaf node of the P2MP LSP receives the packet from the P2MP LSP and retrieves L2 multicast traffic encapsulated within the packet for output on an L2 interface of the one of the multiple receiver devices cross-connected to the P2MP LSP.

22. The network device of claim 21, wherein the one of the multiple receiver devices duplicates the L2 multicast traffic when the one of the multiple receiver devices has two or more egress L2 interfaces cross-connected to the P2MP LSP.

23. The network device of claim 19,
wherein an intermediate device associated with the P2MP LSP that is positioned between the source and one or more of the multiple receiver devices along the P2MP LSP
receives the single copy of the packet from the P2MP LSP and outputs two or more copies of the packet when two or more of the plurality of branch LSPs of the P2MP LSP originate at the intermediate device.

24. The network device of claim 19, further comprising a user interface that receives configuration information and sends the configuration information to the CCC module for configuring a CCC switch.

25. The network device of claim 19,
wherein the L2 interface comprises an ingress L2 interface, and
wherein the CCC module configures an ingress CCC switch based on configuration information that specifies a first name for the ingress CCC switch, a second name of the ingress L2 interface, and a third name of the P2MP LSP.

26. The network device of claim 19, wherein one of the multiple receiver devices of the P2MP LSP includes:
an L2 interface comprising an egress L2 interface; and
a CCC module that configures an egress CCC switch based on configuration information that specifies a first name for the egress CCC switch, a second name of the egress L2 interface, and a third name of the receiving P2MP LSP.

27. The network device of claim 19, further comprising a L2 interface module that maintains a record of the L2 interface and maps the L2 interface to a multicast group.

28. The network device of claim 19, wherein the L2 interface couples a L2 multicast source network to the source device.

29. The network device of claim 19, wherein one of the multiple receiver devices associated with a leaf node of the P2MP LSP comprises an L2 interface that couples the one of the multiple receiver devices to an L2 customer network.

30. The network device of claim 19, wherein the computer network comprises a Multi-protocol Label Switching (MPLS) network.

31. The network device of claim 19, wherein the at least one signaling protocol comprises a resource reservation protocol with traffic engineering (RSVP-TE).

32. The network device of claim 19, wherein the at least one signaling protocol establishes the point to multi-point (PSMP) LSP with penultimate hop popping turned off such that each of the multiple receiver devices advertises a non-null label.

33. A non-transitory computer-readable medium comprising instructions that cause a programmable processor to:
establish a plurality of branch label switched paths (LSPs), wherein each of the branch LSPs have a same source device and a different one of multiple receiver devices within a computer network, and wherein two or more of the branch LSPs are configured to operate over a single physical interface of the source device;
merging, at the source device, the plurality of branch LSPs to establish a point to multi-point (P2MP) LSP having the source device and the multiple receiver devices, wherein the receiver devices are associated with leaf nodes of the P2MP LSP, wherein the source device provides an ingress for the P2MP LSP, and wherein each of the multiple receiver devices provides an egress for the P2MP LSP;
connect an ingress layer two (L2) interface to the P2MP LSP with a circuit cross-connect (CCC) switch such that the ingress L2 interface connects to the physical interface within the source device;
receive a L2 multicast data unit on the ingress L2 interface of the source device;
encapsulate the L2 multicast data unit in a packet; and
forward only a single copy of the packet on the physical interface for transmission to the multiple receiver devices via the P2MP LSP connected to the ingress L2 interface.

34. A system comprising:
a plurality of receiver devices;
a source device comprising:
a single physical interface;
at least one signaling protocol that establishes a plurality of branch label switched paths (LSPs), wherein each of the branch LSPs are established from the source device to a different one of the plurality of receiver devices within a computer network, wherein two or more of the branch LSPs are configured to operate over the single physical interface of the source device, wherein the signaling protocol merges the plurality of branch LSPs to establish a point to multi-point (P2MP) LSP through the computer network, and wherein the source device of the computer network provides an ingress for the P2MP LSP and each of the plurality of receiver devices of the computer network provides at least one of multiple egresses for the P2MP LSP;

at least one layer two (L2) interface card having an L2 interface; and a circuit cross-connect (CCC) module that cross-connects the L2 interface to the P2MP LSP such that the L2 interface is connected to the single physical interface, wherein the network device comprises the source device of the P2MP LSP, and wherein the CCC module receives L2 multicast data unit on the L2 interface, encapsulates wherein the L2 multicast data unit in a packet for output on the P2MP LSP and forwards only a single copy of the packet on the physical interface for transmission to the multiple receiver devices via the P2MP LSP connected to the L2 interface, and wherein each of the plurality of receiver devices includes at least one L2 egress interface and a CCC switch that cross-connects the P2MP LSP to the at least one L2 egress interface.

35. The system of claim 34, wherein the packet comprises a Multi-protocol Label Switching (MPLS) packet and the signaling protocol comprise a resource reservation protocol with traffic engineering (RSVP-TE).

36. The system of claim 34, wherein the at least one signaling protocol establishes the point to multi-point (PSMP) LSP with penultimate hop popping turned off such that each of the multiple receiver devices advertizes a non-null label.

* * * * *

UNITED STATES PATENT AND TRADEMARK OFFICE
CERTIFICATE OF CORRECTION

| | | |
|---|---|---|
| PATENT NO. | : 7,990,965 B1 | |
| APPLICATION NO. | : 11/192432 | |
| DATED | : August 2, 2011 | |
| INVENTOR(S) | : Aggarwal et al. | |

It is certified that error appears in the above-identified patent and that said Letters Patent is hereby corrected as shown below:

Column 10, Line 11, "to the least", should read --to the at least--

Column 11, Line 31, "wherein the L2" should read --the L2--

Column 13, Line 19, "wherein the L2" should read --the L2--

Signed and Sealed this
Twenty-seventh Day of December, 2011

David J. Kappos
*Director of the United States Patent and Trademark Office*